(12) United States Patent
Uusitalo et al.

(10) Patent No.: US 9,277,375 B2
(45) Date of Patent: Mar. 1, 2016

(54) METHOD AND APPARATUS RELATING TO A MOOD STATE OF A USER

(71) Applicant: Nokia Technologies Oy, Espoo (FI)

(72) Inventors: Mikko A. Uusitalo, Helsinki (FI); Jari Kangas, Tampere (FI); Akos Vetek, Helsinki (FI); Leo Karkkainen, Helsinki (FI); Jukka P. Saarinen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 568 days.

(21) Appl. No.: 13/631,006

(22) Filed: Sep. 28, 2012

(65) Prior Publication Data
US 2014/0094156 A1    Apr. 3, 2014

(51) Int. Cl.
*H04M 3/00* (2006.01)
*H04W 4/12* (2009.01)
*H04W 4/20* (2009.01)

(52) U.S. Cl.
CPC . *H04W 4/12* (2013.01); *H04W 4/20* (2013.01)

(58) Field of Classification Search
CPC .............. B60W 10/08; B60W 20/00; B60W 2520/125; B60L 2240/423; B60L 7/003; H04W 8/245; H04W 4/12; H04W 4/20; H04M 1/72525; H04M 1/72522; H04M 2250/12; H04M 1/72572; H04M 1/72566; G06Q 10/10
USPC ........... 455/418; 345/474, 418; 434/236, 319; 84/637, 601, 600; 706/12
See application file for complete search history.

(56) References Cited

U.S. PATENT DOCUMENTS

| | | | |
|---|---|---|---|
| 7,940,186 B2 | 5/2011 | Aaron et al. | |
| 2006/0165040 A1* | 7/2006 | Rathod | G06Q 10/10 370/335 |
| 2006/0187897 A1* | 8/2006 | Dabbs | H04W 4/06 370/349 |
| 2009/0002178 A1 | 1/2009 | Guday et al. | |
| 2009/0141983 A1 | 6/2009 | Bing et al. | |
| 2010/0022279 A1* | 1/2010 | Hoberg et al. | 455/567 |
| 2010/0087974 A1 | 4/2010 | Nakajima et al. | |
| 2010/0211431 A1* | 8/2010 | Lutnick et al. | 705/10 |
| 2010/0328088 A1* | 12/2010 | Lin et al. | 340/666 |
| 2012/0172059 A1* | 7/2012 | Kim et al. | 455/456.3 |

FOREIGN PATENT DOCUMENTS

| | | |
|---|---|---|
| CN | 201668397 | 12/2010 |
| GB | 2480056 | 11/2011 |
| WO | WO-2007/079126 | 7/2007 |

OTHER PUBLICATIONS

Likamwa, R., et al.; :Can Your Smartphone Infer Your Mood?; Rice University; Microsoft Research Asia; dated 2011.

* cited by examiner

*Primary Examiner* — Mahendra Patel
(74) *Attorney, Agent, or Firm* — Alston & Bird LLP

(57) ABSTRACT

Apparatus configured to:
receive an indication of a mood state of a user of the apparatus;
determine and record one or more items of context information associated with the apparatus at the time the indication is received;
receive an instruction to recreate a previously indicated mood state; and
in response to the instruction, use one or more of the items of context information associated with the apparatus at the time of the previously indicated mood state to replicate one or more actions associated with the one or more of the items of context information.

20 Claims, 5 Drawing Sheets

METHOD AND APPARATUS RELATING TO A MOOD STATE OF A USER

FIELD

This specification relates generally to a mood state of a user of a device.

BACKGROUND

It is now common for portable communication devices, such as mobile phones, to be programmed to perform a wide range of functions in addition to basic call making. It is also becoming more common for people to use their portable devices to communicate with one another in diverse ways beyond basic voice calls. Portable devices also now have the memory capacity and processing power to record detailed information about the usage history of the device.

SUMMARY

A first aspect of the invention provides apparatus configured to:

receive an indication of a mood state of a user of the apparatus;

determine and record one or more items of context information associated with the apparatus at the time the indication is received;

receive an instruction to recreate a previously indicated mood state; and in response to the instruction, use one or more of the items of context information associated with the apparatus at the time of the previously indicated mood state to replicate one or more actions associated with the one or more of the items of context information.

The apparatus may be configured to receive a message from a third party, the message comprising a mood state identifier. The apparatus may be further configured to prompt the user of the apparatus to accept or reject the mood state identifier contained in the message. The apparatus may be further configured to accept the mood state identifier as the mood state of the user without further user input if the third party has been pre-authorised by the user.

The apparatus may be configured to determine a mood state of the user from device usage information.

The apparatus may be configured to receive a user input selecting a mood state identifier.

Each item of context information may comprise an indication of an associated action performed on the apparatus prior to the time the indication of the mood state is received. The indication of the action performed may comprise one of:

contacts communicated with;
applications run;
pictures or videos viewed;
web pages accessed;
media files opened; and
services used.

The apparatus may be further configured to determine an importance value for each item of context information, wherein the value depends on a time elapsed since the action associated with the item of context information and/or a duration of the action.

The apparatus may be configured to replicate one or more actions associated with the one or more items of context information by performing one or more of:

initiating communication with a contact associated with the previously indicated mood state;

viewing postings, messages or other media related to a contact associated with the previously indicated mood state;

running an application associated with the previously indicated mood state;

viewing pictures or videos associated with the previously indicated mood state;

accessing a web page associated with the previously indicated mood state;

opening a media file associated with the previously indicated mood state; and using a service associated with the previously indicated mood state.

The apparatus may be further configured to create an ordered list of actions, wherein the order is based on the importance value of the associated item of context information.

The mood state may be a negative mood state or a positive mood state.

The apparatus may be further configured, if an indication of a negative mood state is received subsequent to replication of an action, to decrease the importance value of the item of context information associated with that action.

The apparatus may be further configured, if an indication of a positive mood state is received subsequent to replication of an action, to increase the importance value of the item of context information associated with that action.

The apparatus may be further configured to provide an option to the user to recreate a previously indicated positive mood state in response to receiving an indication of a negative mood state.

The apparatus may be further configured:

if the previously indicated mood state is a negative mood state, to detect that actions associated with items of context information associated with the negative mood state have been performed; and in response to the detection, to inform the user that actions associated with a negative mood state have been performed.

The apparatus may be configured to receive a user input at the device selecting a mood state identifier in order to receive an instruction to recreate a previously indicated mood state.

The apparatus may be further configured to send a message indicating the mood state of the user of the apparatus to one or more third party devices and/or appending an indication of the mood state of the user of the apparatus to messages and/or presence status notifications sent by the apparatus.

A second aspect of the invention provides a method comprising:

receiving an indication of a mood state of a user of a device;

determining and recording one or more items of context information associated with the device at the time the indication is received;

receiving an instruction to recreate a previously indicated mood state; and in response to the instruction, using one or more of the items of context information associated with the device at the time of the previously indicated mood state to replicate one or more actions associated with the one or more of the items of context information.

A third aspect of the invention provides a computer program comprising instructions that when executed by computer apparatus control it to perform the method of the second aspect of the invention.

A fourth aspect of the invention provides apparatus comprising:

means for receiving an indication of a mood state of a user of the device;

means for determining and recording one or more items of context information associated with the device at the time the indication is received;

means for receiving an instruction to recreate a previously indicated mood state; and means responsive to the instruction, for using one or more of the items of context information associated with the device at the time of the previously indicated mood state to replicate one or more actions associated with the one or more of the items of context information.

A fifth aspect of the invention provides a non-transitory computer-readable storage medium having stored thereon computer-readable code, which, when executed by computing apparatus, causes the computing apparatus:

to receive an indication of a mood state of a user of the apparatus;

to determine and record one or more items of context information associated with the apparatus at the time the indication is received;

to receive an instruction to recreate a previously indicated mood state; and in response to the instruction, to use one or more of the items of context information associated with the apparatus at the time of the previously indicated mood state to replicate one or more actions associated with the one or more of the items of context information.

A sixth aspect of the invention provides apparatus comprising at least one processor and at least one memory including computer program code, the at least one memory and the computer program code configured to, with the at least one processor, cause the apparatus at least to:

receive an indication of a mood state of a user of the apparatus;

determine and record one or more items of context information associated with the apparatus at the time the indication is received;

receive an instruction to recreate a previously indicated mood state; and in response to the instruction, use one or more of the items of context information associated with the apparatus at the time of the previously indicated mood state to replicate one or more actions associated with the one or more of the items of context information.

BRIEF DESCRIPTION OF THE DRAWINGS

Embodiments will now be described, by way of example only, with reference to the accompanying drawings, in which.

DETAILED DESCRIPTION

Figure 1:
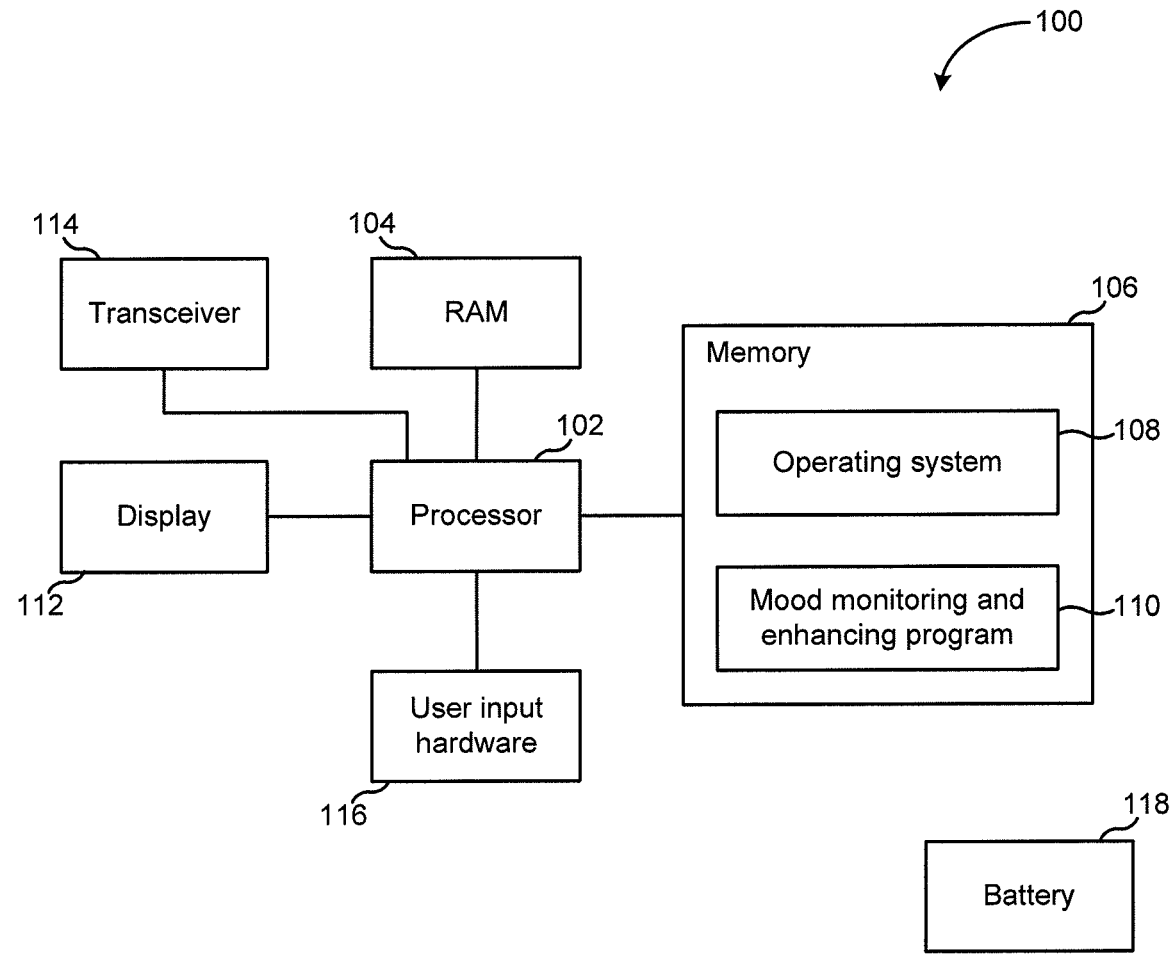
FIG. 1 is a block diagram illustrating internal components of a user device.

Referring firstly to FIG. 1, a block diagram illustrating internal components of a user device 100 is shown. The user device (also referred to herein as apparatus) includes a processor 102. The processor 102 controls operation of the other hardware components of the user device 100. The processor 102 and other hardware components may be connected via a system bus (not shown). Each hardware component may be connected to the system bus either directly or via an interface. The user device 100 comprises working or volatile memory, such as Random Access Memory (RAM), 104 and a non-volatile memory 106. The non-volatile memory 106 stores an operating system 108 and a mood monitoring and enhancing program 110, which may or may not be a distinct application, as well as storing data files and associated metadata. The user device comprises a display 112. The display may be a touch sensitive display having a display part and a tactile interface part. The user device may comprise a transceiver 114 for communication via a range of frequencies and communication standards. The user device may comprise one or more examples of user input hardware 116, such as hardware keys. The user device 100 also houses a battery 118 to power the device.

The processor 102 is configured to send and receive signals to and from the other components in order to control operation of the other components. For example, the processor 102 controls the display of content on display 112 and may receive signals as a result of user inputs at a tactile interface. The display 112 may be a resistive touch screen or capacitive touch screen of any kind. The display 112 may detect the proximity of a hand or a pointing device as input instead of, or in addition to, physical touch at a display. The display may alternatively not be a touch screen. For instance it may be a liquid crystal display (LCD).

The user input hardware 116 may refer to hardware keys and may also include a QWERTY or numeric keypad, a trackpad, a movement or proximity detector, a remote control or a microphone. The user input hardware 116 functions in addition to the touch sensitive display 112, which also receives user inputs.

Transceiver 114 is configured to communicate over a wireless link, such as a GSM, CDMA, UMTS, LTE, WiMax or IEEE 802.11 (Wi-Fi) link. The transceiver 114 circuitry comprises one or more antennas (not shown). The transceiver 114 may be used to exchange voice, text and video data in any suitable format.

The user device 100 may be a mobile phone, PDA or tablet computer of any kind. Other standard or optional components of the user device 100, such as microphones, speakers and cameras, are omitted. The processor 102 may be an integrated circuit of any kind. The processor 102 may access RAM 104 in order to process data and may control the storage of data in memory 106. Memory 106 may be a non-volatile memory of any kind such as a Read Only Memory (ROM), a flash memory and a magnetic drive memory. The RAM 104 may be a RAM of any type, for example Static RAM (SRAM), Dynamic RAM (DRAM) or a Flash memory.

The processor 102 operates under control of the operating system 108. The operating system 108 may comprise code relating to hardware such as the display 112 and user inputs 116, as well as the basic operation of the user device 100. The operating system 108 may also cause activation of other software modules stored in the memory 106, such as the mood monitoring and enhancing program 110.

The mood monitoring and enhancing program 110 comprises software configured to monitor actions performed by a user of the device 100. For example, the mood monitoring and enhancing program 110 may monitor which contacts are communicated with, which applications are run, which messages or postings are viewed (and which contacts these messages or postings relate to), which pictures or videos are viewed (and which contacts these pictures or videos relate to, if any), which web pages are accessed, which messages are sent and received, the contents of these messages, any services which are used and any other media files which are opened. The mood monitoring and enhancing program 110 may record the times at which these actions are performed and the duration of the actions if applicable. The mood monitoring and enhancing program 110 may record all of this information e.g. in a plurality of lists stored in the memory 106. Alternatively or in addition to this information could be stored in network, e.g. in network servers.

The mood monitoring and enhancing program 110 is configured to determine a mood state of a user of the device 100. The mood monitoring and enhancing program 110 is configured to receive indications of the mood state of a user of the device 100. Such indications may be input by the user themselves by selecting from a list of mood state indicators. Alternatively, the mood monitoring and enhancing program 110 may receive messages from third parties, via the transceiver 114, containing a mood state identifier. The program 110 may store a list of those contacts permitted to send such messages. Alternatively, the mood monitoring and enhancing program 110 may itself determine a mood state of a user based on the monitored actions.

The mood monitoring and enhancing program 110 may be configured to append an indication of a mood state of a user to messages and postings sent by the user and/or as part of a presence status of the user. The indication may be in the form of words or a static or moving graphic, or audio and/or the like.

The mood monitoring and enhancing program 110 is also configured to attempt to recreate a previously recognised mood state. The program 110 may do this by performing actions that have been associated with the target mood state. Each action associated with a particular mood state is given a weighting indicating its influence on that mood state. The mood monitoring and enhancing program 110 may use the weighting values to determine an order in which to apply actions when attempting to recreate a target mood state. The program 110 may also determine whether an action is having the desired effect and modify the weighting value of that action accordingly. The weighting values may be positive or negative. Alternatively, there may be separate positive and negative weighting values, each of which is positive (or zero).

The "mood states" may broadly be divided into positive mood states and negative mood states, where the positive mood states are in general desirable while the negative mood states are generally undesirable. Positive mood states may comprise "happy", "excited", "relaxed", "energized" or similar. Each positive mood state may be distinct from the others and different device actions may be influential in recreating each of the different positive states. Negative mood states may comprise "unhappy", "angry", "stressed" or similar. Each negative mood state may be distinct from the others and different device actions may be influential in recreating each of the different negative states. There may also be neutral mood states. Neutral mood states may have actions associated with them and be the target of mood recreation attempts in the same way as positive or negative moods.

The mood monitoring and enhancing program 110 may be configured to monitor actions performed on the device 100 and, if actions are detected which previously led to a negative mood state, to issue a warning to the user. The program 110 may also then offer the option of setting a positive mood state as a target mood state.

Figure 2:
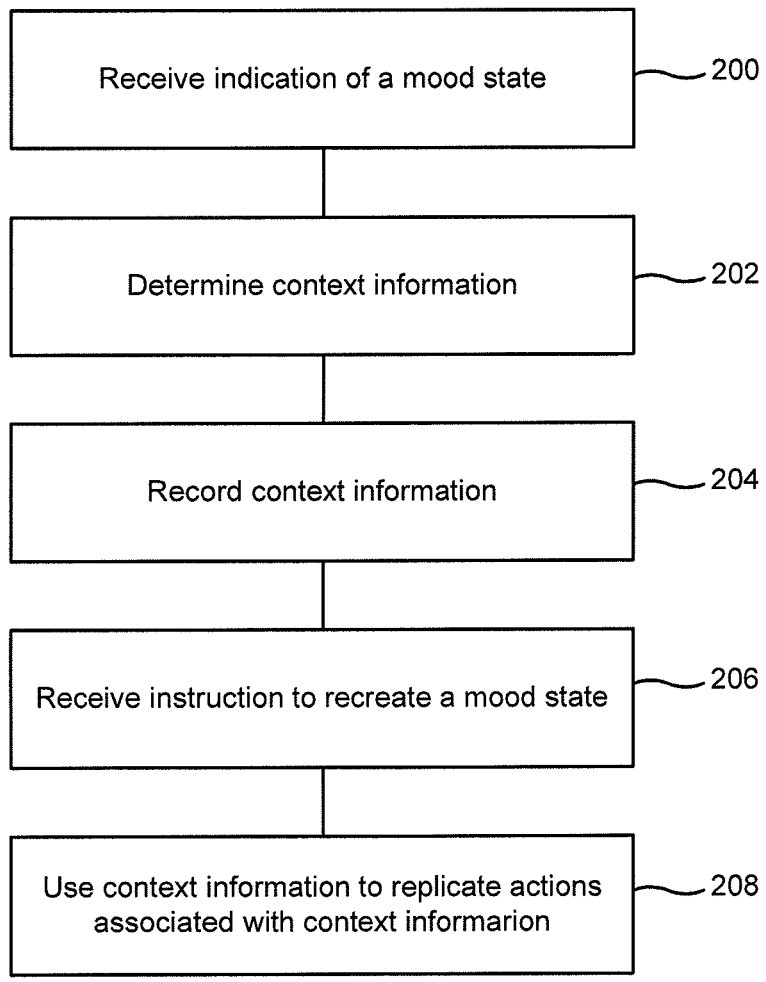
FIG. 2 is a flow chart illustrating an example operation of the device of FIG. 1 according to example embodiments of the invention.

Referring now to FIG. 2, a flowchart illustrating an example operation of the device 100 of FIG. 1 is shown. At step 200 an indication of a mood state is received. This indication may be received as a result of a user of the device 100 selecting a mood state identifier from a list. For example, in response to user inputs received via user input hardware 116 or touch sensitive display 112, the mood monitoring and enhancing program 110 may control processor 102 to display a list of predefined mood state identifiers on display 112. The user may select one of these mood state identifiers, which is then set as the current mood state of the user. Alternatively the mood monitoring and enhancing program 110 may be configured to monitor actions performed by the user device 100 and to estimate a mood state of the user. The estimated mood state may be set as the current mood state of the user automatically or alternatively the program 110 may present the user with an option to accept or reject the estimated mood state.

Once the current mood state of the user has been set, the mood monitoring and enhancing program 110 determines context information associated with the mood state at step 202. The mood monitoring and enhancing program 110 may create a list of monitored device actions performed within a predetermined time prior to receiving the indication of the mood state. The predetermined time may be any suitable length of time, for example, one hour, two hours, four hours or six hours. Examples of device actions are voice, text or video communication with a contact, running or executing an application, viewing a picture or video, accessing a web page, opening a media file, using a service, holding and touching the device, and/or the like. Each instance of an action is treated as a separate item of context information. For example, instances of communication with two different contacts are treated as separate items of context information. Thus each action which is performed in the predetermined time before the indication of the user's mood state is represented by an item of context information. Each item of context information may have an importance value associated with it. For example, the importance value may be a positive or negative integer representing the influence that that action has on the indicated mood state. The determination of the importance value is described in greater detail with reference to FIG. 4 below. At step 204 the item or items of context information are recorded in the memory 106 of the device 100.

At step 206 the mood monitoring and enhancing program 110 receives an instruction to recreate a previously indicated mood state. Such an instruction may be received in response to user selection of a target mood state from a list of mood state indicators. Alternatively, another service or application running on the device 100 may request that a previously indicated mood state be recreated. Alternatively, the mood monitoring and enhancing program 110 may generate the instruction to recreate a previously indicated mood state. For example the program 110 may be informed or may determine that the user's mood state is negative and generate an instruction to recreate a positive mood state. The user may optionally be given the opportunity to accept or reject a target mood state instruction generated by the mood monitoring and enhancing program 110 or by another program or service.

At step 208 the mood monitoring and enhancing program 110 uses the context information for the target mood state to replicate actions associated with that context information. For example, if a media file such as a music file was opened prior to an indication of a positive mood state, then context information identifying at least the name and file location of the music file is added to the list for that positive mood state. If an instruction is received at step 206 to recreate this positive mood state, the context information may be used to identify the playing of the music file as having a positive effect. The mood monitoring and enhancing program 110 may then control the processor 102 to play the music file. The mood monitoring and enhancing program 110 may first present the user with an option to play the music file (or to play an entire album including the music file) or to reject the action. If several music files were played and are associated with the positive mood state, a list of music files may be presented to the user and the user may make a selection as to which one(s) to play.

As a further example, if a voice call with a contact "A" was placed or received prior to an indication of a positive mood state, then context information identifying contact A and contact details for that contact is added to the list for that positive mood state. If an instruction is received at step 206 to recreate this positive mood state, the context information may be used to identify communication with contact A as having a positive effect. The mood monitoring and enhancing program 110 may then control the processor 102 to present the user with options to place a voice call or video call to contact A or to send a text message, email or instant message to contact A. The device may present a user with a list of all of the contacts communicated with in a predetermined period before the indication of the mood state was received. The contacts may be presented in reverse order of time elapsed since the communication. The user may then select a contact from the list to initiate communication. If the communication is a voice call and the selected contact is unavailable, the list of contacts may again be presented to the user so that a different contact may be selected.

As another example, if the device 100 was used to browse a web page prior to an indication of a positive mood state, then context information identifying the URL of the web page (and optionally the URL of a web site home page which hosts the browsed web page) is added to the list for that positive mood state. If an instruction is received at step 206 to recreate this positive mood state, the context information may be used to identify viewing of the web page (or of the web site in general) as having a positive effect. The mood monitoring and enhancing program 110 may then control the processor 102 to open a browsing application and to navigate to the web page, or to a home page of the host web site. The mood monitoring and enhancing program 110 may first present the user with an option to navigate to the web page, to the home page of the host web site, or to reject the action. The user may be presented with a list of recent web pages.

The context information may be stored on a cloud based network server instead of, or in addition to, being stored in a memory of the device. The cloud based server may be configured to gather information about device usage and the mood state of the user and may generate the lists of context information. The cloud based server may also issue commands to the user device to recreate previous mood states and may provide the context information to the device. A cloud based server may comprise multiple servers at a common location or distributed across plural locations. The cloud based server comprises computer code that causes the server(s) to gather information about device usage and the mood state of the user and may generate the lists of context information, and optionally to issue commands to the user device to recreate previous mood states and may provide the context information to the device.

Figure 3:
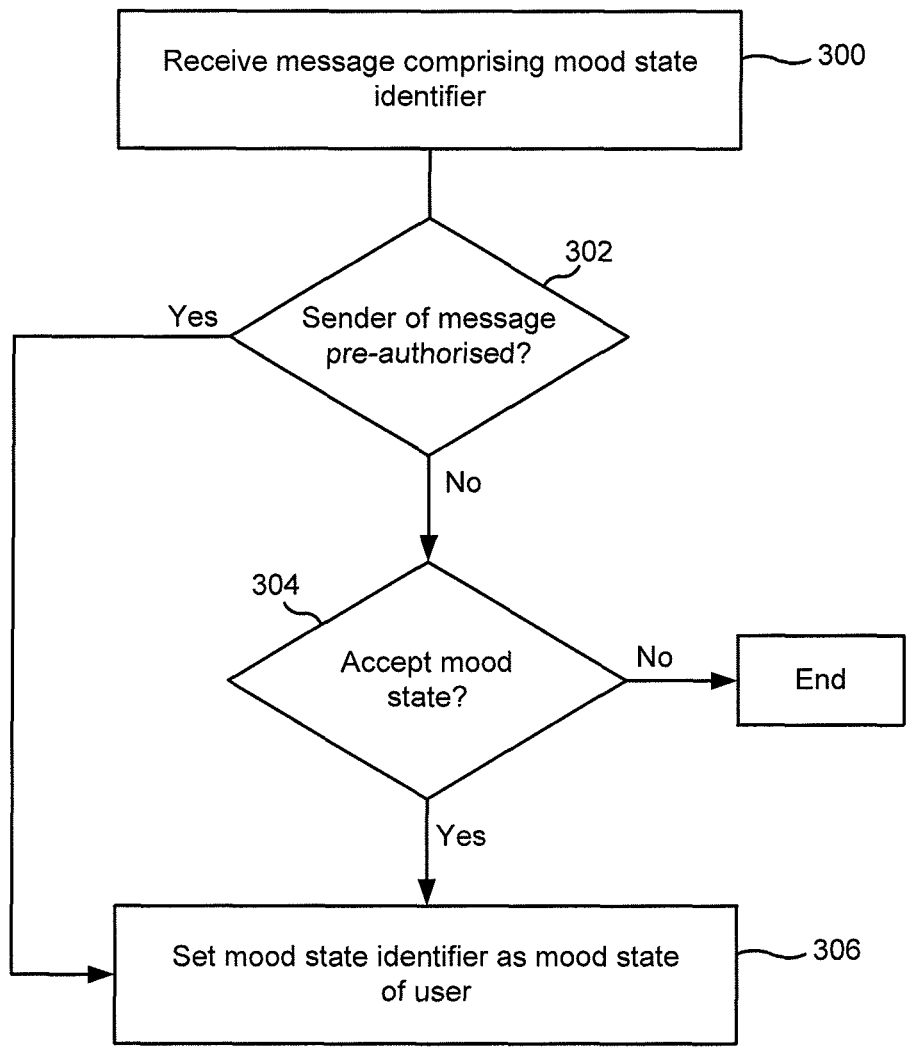
FIG. 3 is a flow chart illustrating an example embodiment of step 200 of FIG. 2.

FIG. 3 is a flow chart illustrating in greater detail an example embodiment of step 200 of FIG. 2. At step 300 a message is received comprising a mood state identifier. This message is received from a third party via the transceiver 114. The message may e.g. be an SMS message in a predefined format. In some embodiments the message is generated by another instance of the mood monitoring and enhancing program 110 running on the third party's device. For example, the mood monitoring and enhancing program 110 may allow users to select mood state identifiers from a list and to send these identifiers to other users. A third part user may select to send a message to the user, and may then be presented with an option to send either a normal text message or a "mood message". Upon selection of a mood state identifier the program 110 may generate a message in a predefined format and cause it to be sent via the transceiver 114. Alternatively, the mood monitoring and enhancing program 110 may create an SMS text message having a predefined format. The user may then be able to add further text to the beginning or end of this message before it is sent. It should be noted that the message is not limited to SMS and may be sent and/or received in other format, e.g. in a proprietary message format, as an email, as an instant messaging message, as a multimedia message and/or the like.

Upon receiving the mood state identifier message the user device 100 determines at step 302 whether the sender of the message is pre-authorised. The user may determine which contacts are pre-authorised to send mood state identifier messages, for example using a settings menu of the mood monitoring and enhancing program 110. Alternatively, the mood monitoring and enhancing program 110 may be configured to connect with a profile of the user, for example an online profile, and to determine a list of pre-authorised senders. For example, the online profile may be part of a social network service, such as Facebook™ or LinkedIn™. The list of pre-authorised senders may be determined by the relationship of the user to third party users as expressed via these services. The mood monitoring and enhancing program 110 may be configured to add only those third party users listed as "friends", "close friends", "family" etc. to the list of pre-authorised senders. Any third party user with a different relationship status (for example "colleague" or "business partner") is not added to the list. If it is determined at step 302 that the sender of the message is pre-authorised then the process continues to step 306 in which the mood state identifier in the received message is set as the current mood state of the user. The user may be notified of the identity of the sender of the message. Alternatively, messages may be received anonymously, even from third parties that are categorised as pre-authorised. The third party may choose to send the message with their identity or anonymously. A code may be input by the third party or automatically which is sent together with the message. If the third party has been pre-authorised, the mood state contained in the message is automatically accepted, even though the user would not recognise the source of the message.

If it is determined at step 302 that the sender of the message is not pre-authorised, that the message has been sent anonymously, or that no third parties have been pre-authorised then the process continues to step 304 in which the user is presented with an option to either accept or reject the received mood state identifier. If at step 304 the user decides to reject the received mood state identifier then the process ends at step 308 and no further action is taken by the mood monitoring and enhancing program 110. If at step 304 the user decides to accept the received mood state identifier then the process continues to step 306 in which the received mood state identifier is set as the current mood state of the user.

FIG. 3 represents only one example embodiment of how an indication of a mood state may be received by the mood monitoring and enhancing program 110. As previously mentioned, the user may select a mood state from a list of mood state identifiers presented to them. Alternatively, or in addition, the mood monitoring and enhancing program 110 may be configured to learn, by machine learning based pattern recognition, which patterns of actions are likely to lead to a positive or negative mood of the user. The program 110 may recognise these patterns and suggest a current mood state identifier to a user, which the user may accept or reject. As another example, the user's handling of the device may be observed and recorded. For example, the time and the way the user touches or holds the device may give indication as to the user's mood. Determining a context or operational state of the device while the user holds the device may indicate the user's mood. For example, if the user fiddles with the device or swipes or touches the device many times while it is locked, it could indicate boredom. Thus an instruction may be received to create a positive mood.

Multiple methods of user mood determination may be used simultaneously, and the program 110 may allow a user to compare their mood as perceived by them with how it is perceived by third parties and by the program 110. The determined mood state of the user may remain the "default" mood state until a different mood state is detected. The mood monitoring and enhancing program 110 may monitor actions performed on the device and, if no change in the user's mood is detected, infer that these actions contribute to the current "default" mood.

Figure 4:
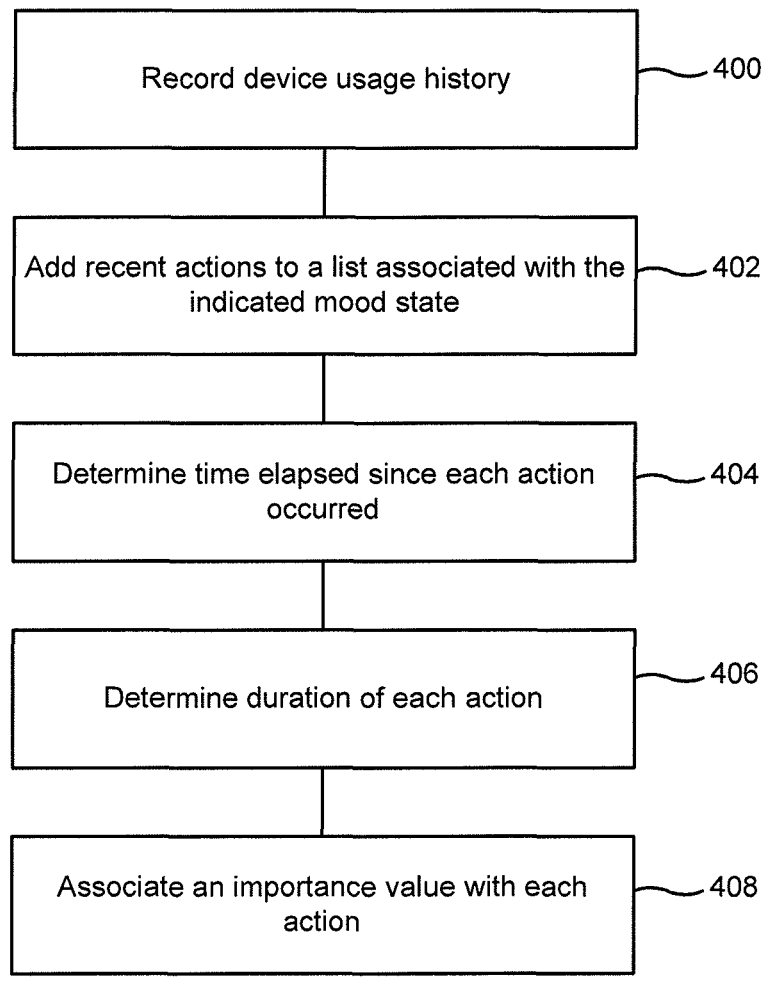
FIG. 4 is a flow chart illustrating how context information associated with device actions is generated.

FIG. 4 is a flowchart illustrating how context information associated with device actions is generated. At step 400 the mood monitoring and enhancing program 110 causes the usage history of the device to be recorded. This step may be an ongoing process, i.e. the program 110 may continuously monitor all actions of a certain type performed on the device 100. In order to reduce the memory requirements of this monitoring, the program 110 may only store details of those actions which occurred recently. For example only those actions which occurred within the last two, four or six hours may be recorded. After this time period has elapsed the information may be overwritten. Alternatively, a finite size of memory may be set aside for the recoding of context information. Thus step 400 is ongoing when an indication of a mood state is received. When an indication of a mood state is received, the program 110 interrogates the recent device usage history. At step 402 the program 110 creates context information relating to the recent actions and adds this information to a list associated with the indicated mood state. In the situation that this is the first occurrence of the indicated mood state, the program may also be configured to create the list.

At step 404, the program 110 determines the time elapsed since each of the actions on the list occurred. This information is added to the context information relating to each action. At step 406 the program 110 may optionally determine a duration of each action if applicable. For example the length of a phone call or the amount of time spent viewing a particular web page may be recorded. Some actions such as the opening of text messages or of other media files may not have a duration associated with them.

At step 408 the program 110 associates an importance value with each action on the list. The importance value may be determined based on the time elapsed since that action occurred and/or the duration of that action. For example, those actions which occurred more recently are given a higher importance value. The "context information" for an action may thus comprise the details of the action, the time elapsed since the action, the duration of the action and the associated importance value of the action In the case where this is not the first occurrence of the indicated mood state, a list already exists detailing one or more actions. In this case, any actions which have occurred for the first time prior to receiving the indication of the mood state are added to the list as previously described. Any actions which are already on the list may have their associated importance value modified as a result of occurring again. For example, an importance value may be calculated as before and this value added to the existing value in the list. Alternatively, the repeat occurrence of an action may confer an additional increase in the importance value. For example, the importance value calculated for the most recent occurrence of the action may be multiplied by a weighting factor dependent on the total number of occurrences of the action, or the combined importance value associated with the action may be multiplied by a weighting factor. Conversely, if an action which was previously associated with the indicated mood state has not occurred again prior to the most recent indication of the mood state, the importance value associated with that action may be decreased.

The process illustrated in FIG. 4 is applicable whether the indicated mood state is a positive mood state or a negative mood state. Thus each mood state has a separate list of actions which may have led to or influenced that mood state. If the mood state is a negative mood state the importance value associated with an action represents the influence of that action in creating the negative mood state.

In an example embodiment of the invention there may exist only a positive mood state and a negative mood state. A single list of context information may be generated representing the influence of actions on both the positive and negative mood states. In this embodiment, if a positive mood state is detected, any actions which occurred recently have their importance value increased in accordance with the rules previously described. If a negative mood state is detected, then any actions which occurred recently have their importance value decreased correspondingly. In this embodiment the importance value may be positive or negative indicating a tendency to cause the positive mood state or the negative mood states respectively.

The importance values may be used to generate warnings should the user perform certain actions. While monitoring the device usage the mood monitoring and enhancing program 110 may periodically compare the recent actions with the lists of context information for each predetermined mood state. If the program 110 detects a number of actions having a high importance value for creating a negative mood state, a warning may be generated and displayed to the user indicating that a negative mood state may result from their actions. For example, as each action is performed its importance values for creating positive and negative mood states are compared. If the cumulative importance value of recently performed actions for one or more negative mood states exceeds a threshold, then a warning may be generated.

The warning may comprise a symbol or graphic which appears somewhere on the display 112. In one embodiment the graphic is a dragon, however any suitable graphic may be chosen. The graphic may be user determined. The size and/or opacity of the graphic may depend on the amount by which the threshold value has been exceeded. For example, the graphic may become larger and less opaque as the user performs more actions having a high importance value for creating a negative mood state. In some embodiments the graphic may be relatively small and unobtrusive, however a second threshold value may exist at which a clearer warning is displayed to the user. For example, a sound may be played, and/or tactile feedback given, and/or a popup window displayed. The popup window may optionally offer the user an option to select another type of target mood state. For example, options relating to each of the known positive mood states may be displayed and the user may select one of these options to set that mood as the target mood state.

Once a current mood state of the user has been set, the mood monitoring and enhancing program 110 may inform contacts of the user about the user's mood state. For example, a message may be automatically generated and sent to those contact of the user who also have the mood monitoring and enhancing program 110. Alternatively, the informing may be more passive, such as adding a mood state identifier or image to the end of messages. The mood monitoring and enhancing program 110 may also connect with a profile of the user, for example an online profile, and display an indication of the user's mood state next to the user's personal information on the profile.

Figure 5:
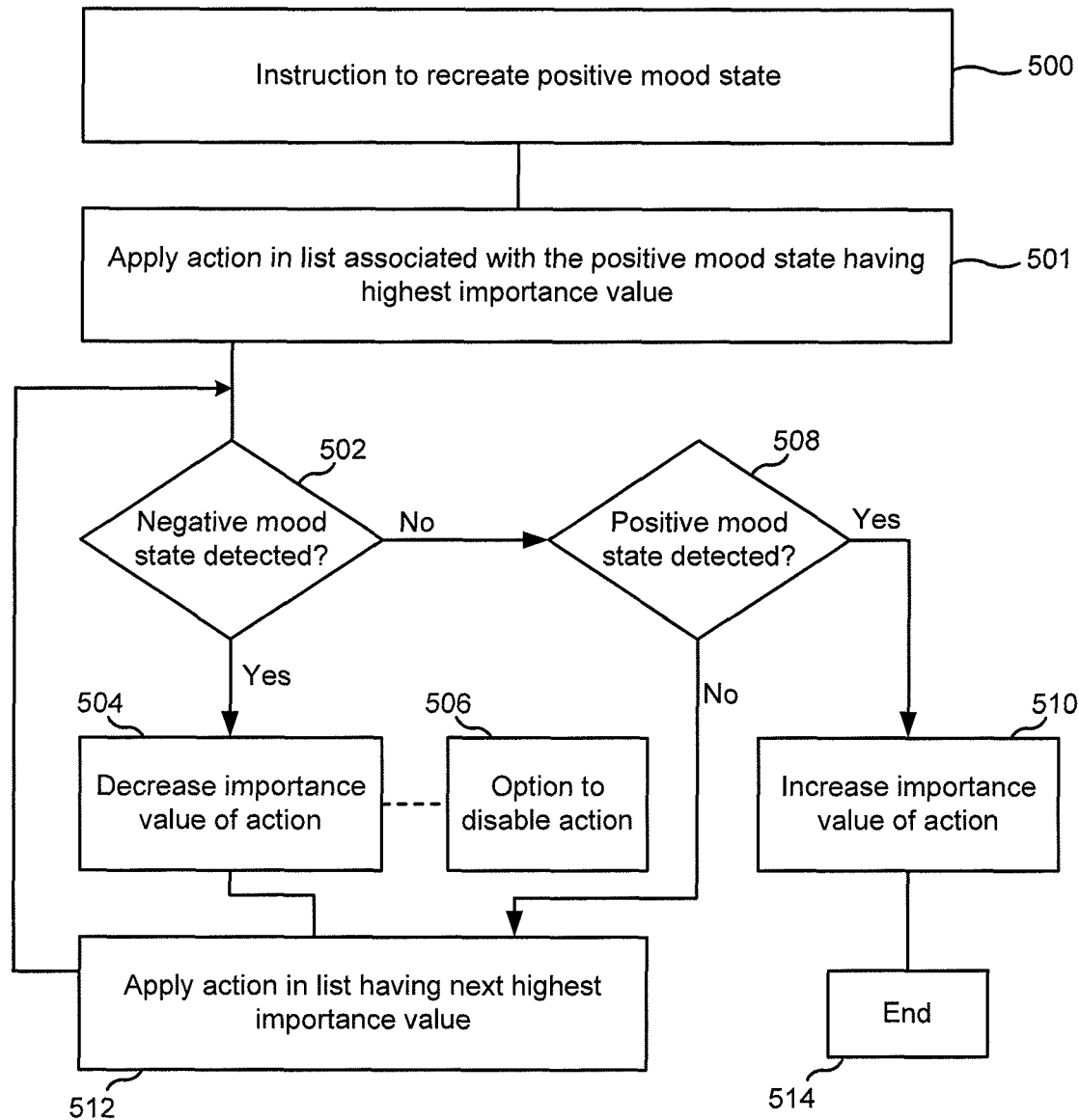
FIG. 5 is a flow chart illustrating in greater detail the processes occurring in step 208 of FIG. 2.

FIG. 5 shows in greater detail the processes occurring in step 208 of FIG. 2. At step 500 an instruction is received to recreate a positive mood state. For the purposes of this description, it is assumed that a user would only wish to recreate a positive mood state. However, the following method is equally applicable to the recreation of negative or neutral mood states. Upon receiving the instruction, at step 501, the mood monitoring and enhancing program 110 causes the action in the list associated with the target positive mood state having the highest importance value to be performed.

The process continues at step 502 in which it is determined whether a negative mood state is detected in response to the action. The negative mood state may be detected in any of the ways previously described, i.e. the user may select a negative mood state indicator from a list, the device may detect a negative mood state from device usage information or a message may be received from a third party comprising a mood state identifier. If a negative mood state is detected at step 502, the process continues to step 504 in which the importance value of the applied action is decreased. The decrease in the importance value of the action may be of a predetermined quantity or may be dependent on other factors such as the specific negative mood state detected or the time elapsed between performance of the action and detection of the negative mood state.

Step 504 may be followed by an optional step 506 in which the user is presented with an option to disable the applied action for recreating the positive mood state. Thus when an instruction to recreate the positive mood state is again received, the action which caused the negative mood state will not be applied and will not be offered to the user as an option. If the user selects to disable the action, the action may be disabled for all positive mood states or only for the specific positive mood state being recreated at the time. Disabling a particular action may comprise removing the context information relating to that action from the list or decreasing the importance value of the action to a large negative number.

If it is determined at step 502 that a negative mood state is not detected, the process continues to step 508 in which it is determined whether a positive mood state is detected. The positive mood state may be detected in any of the ways previously described, i.e. the user may select a positive mood state identifier from a list, the device may determine a positive mood state from device usage information or a message may be received from a third party comprising a positive mood state identifier. In embodiments in which there are several distinct positive mood states, each having an associated list of items of context information, then a positive determination at step 508 requires detection of the specific positive mood state which the mood monitoring and enhancing program 110 is attempting to recreate.

If the positive mood state is detected, the process continues to step 510 in which the importance value of the applied action is increased. The amount of the increase may be a predetermined quantity or may be dependent on other factors such as the time elapsed between application of the action and detection of the positive mood state. Thus if the action in the list having the highest importance value is applied and a positive mood state results, the importance value of this action is further increased. As the positive mood state has successfully been recreated the process then ends at step 514.

If a negative mood state was detected at step 502, or if neither a negative nor positive mood state are detected in response to the action, then the process continues to step 512. In this step the action in the list having the next highest importance value is applied. A negative determination at step 508 may only occur after a predetermined time has elapsed. For example, if no positive mood state is detected five or ten minutes after application of an action then it may be determined that no positive mood state has resulted from the action. However, in this circumstance, the importance value of the action is not decreased. After the application of the action in the list having the next highest importance value at step 512 the process again returns to step 502. In this way the actions in the list associated with the target positive mood state are applied in order of importance value until a positive mood state is detected at step 508 resulting in the end of the process. Furthermore the importance values of the actions in the list are modified depending on their effectiveness in creating the target positive mood state. This results in an improvement of the mood enhancing part of the program 110, allowing for changes in the user's tastes and opinions and resulting in a greater likelihood of success in recreating the positive mood state in the future.

In an alternative embodiment to the process illustrated in FIG. 5, if at step 508 the positive mood state is not detected, the process may proceed to step 504 in which the importance value of the action is decreased. Therefore the importance value of a particular applied action is always decreased unless that action results in detection of a positive mood state.

The positive and negative (and neutral) mood states previously described may be represented on the user device 100 and on any third party devices running the mood monitoring and enhancing program 110 by images. The images may be static or animated graphics of any suitable kind. Additionally, each user may choose the images which represent each of the individual mood states. In some embodiments each mood state may be initially represented by a predefined image. However if the importance value associated with a particular image file on the user device 100 exceeds a threshold, then that image may replace the predefined image as the representation of that mood state. Similarly, if a particular music track or album or an application or web page has an image associated with it in the memory 106 of the device, then that image may replace the predefined image if the importance value of the associated action exceeds a threshold level. The replacement of a predefined image with an image of particular importance to a user may be visible only on the user device 100 when the user is selecting or accepting recommendations of mood state identifiers and may not be visible to third party users.

The foregoing description is applicable to many different situations. For example, users may wish to indicate their mood state to others as part of a message or posting or as part of a presence status. The mood state information may therefore be viewed by friends and family of the user allowing them to monitor the estimated mood of the user. For example a parent may be able to check on the estimated mood of their child remotely using the mood monitoring and enhancing program 110. Such notification of a user's mood may allow the friends and family of the user to decide if they should contact the user and in what way they should contact them.

It will be appreciated that the above described embodiments are purely illustrative and are not limiting on the scope of claims. Other variations and modifications will be apparent to a person skilled in the art upon reading the application. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features or combinations of such features.

What is claimed is:

1. Apparatus comprising at least one processor and at least one memory including computer program code, the at least one memory and the computer program code configured to, with the at least one processor, cause the apparatus at least to:
receive an indication of a mood state of a user of the apparatus;
determine and record one or more items of context information associated with the apparatus at the time the indication is received;
receive an instruction to recreate a previously indicated mood state; and
in response to the instruction, use one or more of the items of context information associated with the apparatus at the time of the previously indicated mood state to replicate one or more actions associated with the one or more of the items of context information.

2. Apparatus according to claim 1, wherein the at least one memory and the computer program code are further configured to, with the at least one processor, cause the apparatus to receive a message from a third party, the message comprising a mood state identifier.

3. Apparatus according to claim 2, wherein the at least one memory and the computer program code are further configured to, with the at least one processor, cause the apparatus to prompt the user of the apparatus to accept or reject the mood state identifier contained in the message.

4. Apparatus according to claim 2, wherein the at least one memory and the computer program code are further configured to, with the at least one processor, cause the apparatus to accept the mood state identifier as the mood state of the user without further user input if the third party has been pre-authorized by the user.

5. Apparatus according to claim 1, wherein the at least one memory and the computer program code are further configured to, with the at least one processor, cause the apparatus to receive a user input selecting a mood state identifier.

6. Apparatus according to claim 1, wherein each item of context information comprises an indication of an associated action performed on the apparatus prior to the time the indication of the mood state is received.

7. Apparatus according to claim 6, wherein the indication of the action performed comprises one of:
contacts communicated with;
applications run;
pictures or videos viewed;
web pages accessed;
media files opened; and
services used.

8. Apparatus according to claim 6, wherein the at least one memory and the computer program code are further configured to, with the at least one processor, cause the apparatus to determine an importance value for each item of context information, wherein the value depends on at least one of a time elapsed since the action associated with the item of context information or a duration of the action.

9. Apparatus according to claim 8, wherein the at least one memory and the computer program code are further configured to, with the at least one processor, cause the apparatus to create an ordered list of actions, wherein the order is based on the importance value of the associated item of context information.

10. Apparatus according to claim 8, wherein the at least one memory and the computer program code are further configured to, with the at least one processor, cause the apparatus to determine an importance value for each item of context information, wherein the value depends on at least one of a time elapsed since the action associated with the item of context information or a duration of the action, wherein the mood state is a negative mood state or a positive mood state, and wherein the apparatus is further configured, if an indication of a negative mood state is received subsequent to replication of an action, to decrease the importance value of the item of context information associated with that action.

11. Apparatus according to claim 10, wherein the at least one memory and the computer program code are further configured to, with the at least one processor, cause the apparatus, if an indication of a positive mood state is received subsequent to replication of an action, to increase the importance value of the item of context information associated with that action.

12. Apparatus according to claim 1, wherein the at least one memory and the computer program code are further configured to, with the at least one processor, cause the apparatus to replicate one or more actions associated with the one or more items of context information by performing one or more of:
initiating communication with a contact associated with the previously indicated mood state;
viewing postings, messages or other media related to a contact associated with the previously indicated mood state;
running an application associated with the previously indicated mood state;
viewing pictures or videos associated with the previously indicated mood state;
accessing a web page associated with the previously indicated mood state;
opening a media file associated with the previously indicated mood state; and
using a service associated with the previously indicated mood state.

13. Apparatus according to claim 1, wherein the at least one memory and the computer program code are further configured to, with the at least one processor, cause the apparatus:
if the previously indicated mood state is a negative mood state, to detect that actions associated with items of context information associated with the negative mood state have been performed;
in response to the detection, to inform the user that actions associated with a negative mood state have been performed; and
cause the apparatus to provide an option to the user to recreate a previously indicated positive mood state.

14. Apparatus according to claim 1, wherein the at least one memory and the computer program code are further configured to, with the at least one processor, cause the apparatus to receive a user input at the device selecting a mood state identifier in order to receive an instruction to recreate a previously indicated mood state.

15. Apparatus according to claim 1, wherein the at least one memory and the computer program code are further configured to, with the at least one processor, cause the apparatus to perform at least one of sending a message indicating the mood state of the user of the apparatus to one or more third party devices, or appending an indication of the mood state of the user of the apparatus to messages and/or presence status notifications sent by the apparatus.

16. The apparatus according to claim 1, wherein the apparatus is any of a mobile device, a personal digital assistant, or a tablet computer.

17. A method comprising:

receiving an indication of a mood state of a user of a device;

determining and recording one or more items of context information associated with the device at the time the indication is received;

receiving an instruction to recreate a previously indicated mood state; and in response to the instruction, using one or more of the items of context information associated with the device at the time of the previously indicated mood state to replicate one or more actions associated with the one or more of the items of context information.

18. The method of claim 17, wherein the device is any of a mobile device, a personal digital assistant, or a tablet computer.

19. A non-transitory computer-readable storage medium having stored thereon computer-readable code, which, when executed by computing apparatus, causes the computing apparatus:

to receive an indication of a mood state of a user of the apparatus;

to determine and record one or more items of context information associated with the apparatus at the time the indication is received;

to receive an instruction to recreate a previously indicated mood state; and in response to the instruction, to use one or more of the items of context information associated with the apparatus at the time of the previously indicated mood state to replicate one or more actions associated with the one or more of the items of context information.

20. The non-transitory computer-readable storage medium of claim 19, wherein the apparatus is any of a mobile device, a personal digital assistant, or a tablet computer.

* * * * *